(12) United States Patent
Park et al.

(10) Patent No.: US 6,930,419 B1
(45) Date of Patent: Aug. 16, 2005

(54) BAR TYPE VIBRATION MOTOR

(75) Inventors: Jae Woon Park, Kyungki-do (KR);
Sang Gil An, Kyungki-do (KR); Hyun Gi Yang, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/929,394

(22) Filed: Aug. 31, 2004

(30) Foreign Application Priority Data

Feb. 13, 2004 (KR) .................. 10-2004-0009506
Feb. 25, 2004 (KR) .................. 10-2004-0012511

(51) Int. Cl.[7] .............................................. H02K 7/06
(52) U.S. Cl. ........................................ 310/81; 310/89
(58) Field of Search ............................. 310/81, 89, 90

(56) References Cited

U.S. PATENT DOCUMENTS

| | | | | |
|---|---|---|---|---|
| 4,412,146 A | * | 10/1983 | Futterer et al. | ............ 310/266 |
| 4,590,814 A | * | 5/1986 | Wadensten | ..................... 74/87 |
| 5,036,239 A | * | 7/1991 | Yamaguchi | ................. 310/268 |
| 5,341,057 A | * | 8/1994 | Yamaguchi et al. | .......... 310/81 |
| 5,621,260 A | * | 4/1997 | Fukuoka et al. | ....... 310/154.04 |
| 5,909,074 A | * | 6/1999 | Takaya et al. | ................ 310/81 |
| 5,943,214 A | * | 8/1999 | Sato et al. | ................... 361/752 |
| 5,952,745 A | * | 9/1999 | Yasuda | ................. 310/40 MM |
| 6,563,242 B2 | * | 5/2003 | Ibata et al. | ................... 310/90 |
| 6,608,410 B2 | * | 8/2003 | Sato et al. | ................ 310/67 R |
| 6,717,306 B1 | * | 4/2004 | Kudou et al. | ................. 310/81 |

* cited by examiner

Primary Examiner—Dang Le
(74) Attorney, Agent, or Firm—Lowe Hauptman & Berner, LLP (57) ABSTRACT

A bar type vibration motor includes a stator unit including a body having a bearing insert groove formed at one end thereof and exposed to the outside, and a magnet attached to the body; a rotor unit including a rotary shaft having one end fixed to an eccentric weight, both ends of the rotary shaft being rotatably supported in the body, and an armature fixed to the rotary shaft at a space from the magnet; and a power supply unit including a fixing cap fixed to the body and brushes mounted on the fixing cap to supply voltage to the armature.

21 Claims, 7 Drawing Sheets

BAR TYPE VIBRATION MOTOR

CLAIM OF PRIORITY

This application claims the benefit of Korean Patent Application No. 2004-12511 filed on Feb. 25, 2004, and Korean Patent Application No. 2004-9506 filed on Feb. 13, 2004 in the Korean Intellectual Property Office, the disclosure of which is incorporated herein by reference.

BACKGROUND OF THE INVENTION

1. Field of the Invention

The present invention relates to a bar type vibration motor for generating vibration by rotation of an eccentric weight, and more particularly, to a bar type vibration motor capable of improving a body structure for supporting a rotary shaft fixed to a eccentric weight, a coupling structure of a stationary member and the rotary shaft, and a contacting structure of a commutator and brushes in order to facilitate fabrication, more securely support the rotary shaft, and miniaturize itself.

2. Description of the Related Art

As portable communication instruments generally used at present, mobile phones have various signal-generators to transmit various signals to users.

Therefore, when messages or calls are received, the signal-generators generate sound, light or vibration so that users informed of the incoming of messages or calls.

The signal-generators are generally adopted as sound generators, illumination devices and vibrators.

On the other hand, the vibrators have various vibration motors as vibration sources, in which the vibration motors are usually classified into flat type vibration motors and bar type vibration motors according to their configurations.

The flat type vibration motors are also called coin type vibration motors because they are shaped as thin coins, and the bar type vibration motors are also called cylinder type vibration motors because they have cylindrical configurations.

Both the flat type vibration motors and the bar type vibration motors are operated on the basis of the electromagnetic induction regardless of their configurations.

The electromagnetic induction is a phenomenon in which electromagnetic force is generated across the magnetic field, when current is flown through conductors placed perpendicular to the magnetic field.

The vibration motors convert electric energy into mechanical energy on the basis of the electromagnetic induction and generate vibration from the mechanical energy.

Figure 1A:
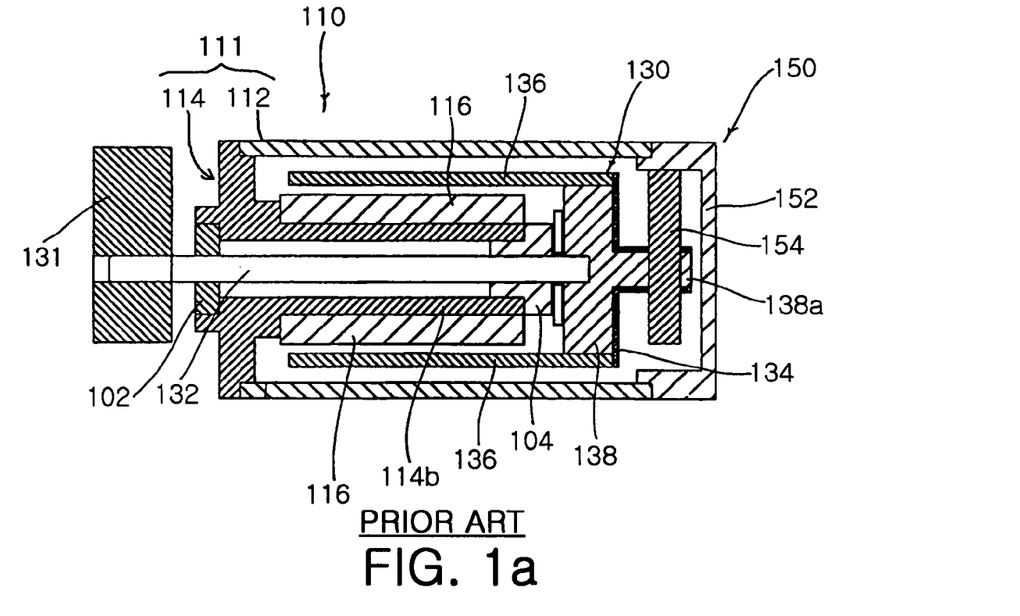
FIG. 1a is a side sectional view illustrating a conventional bar type vibration motor.

FIG. 1a illustrates a conventional bar type vibration motor that will be described hereinafter.

As shown in FIG. 1a, the conventional bar type vibration motor 100 includes a stator unit 110, a rotor unit 130 and a power supply unit 150, in which the stator unit 110 including a body 111 and a magnet 116 will be explained first.

Figure 1B:
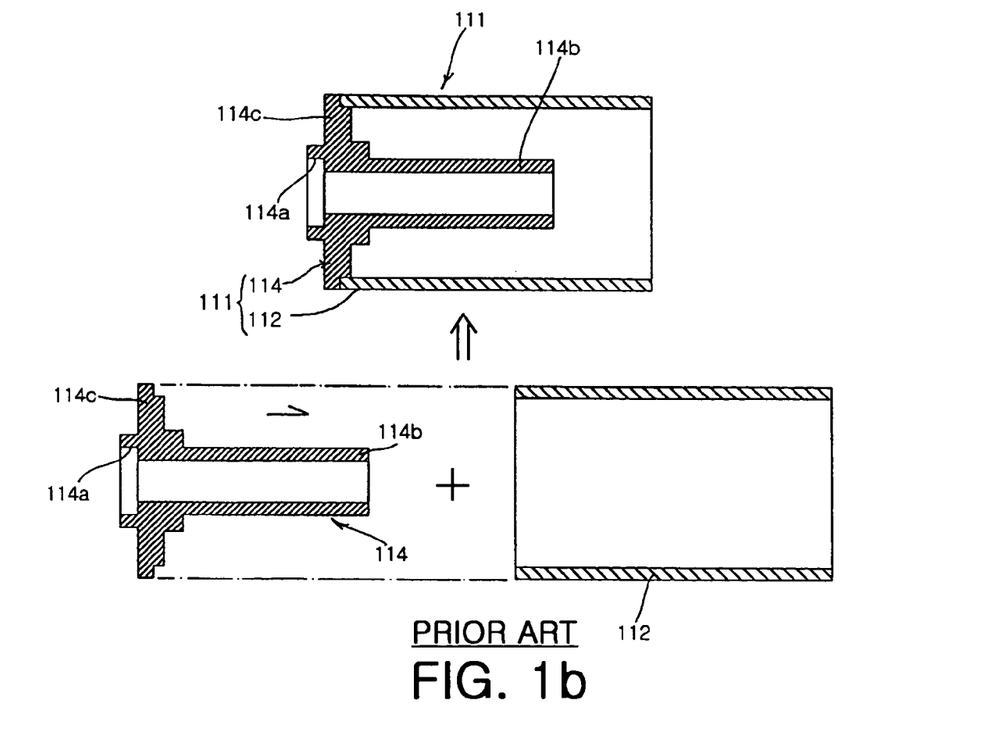

As shown in FIG. 1b, the body 111 includes a housing 112 and a yoke 114. The housing 112 is shaped as a pipe having opened both ends, and the yoke 114 includes a hollow cylindrical yoke body 114b, a bearing insert groove 114a formed at the front end of the yoke body 114b and a flange 114c formed on the periphery of the bearing insert groove 114a.

The body 111 has a double-pipe structure placing the yoke body 114b in the housing 112 by pressing and welding the flange 114c of the yoke 114 to one end of the housing 112.

As shown in FIG. 1a, the body 111 formed by fixing the yoke 114 to the housing 112 and a magnet 116 is attached on the outer surface of the yoke body 114b of the body 111.

Next, the rotor unit 130 will be explained.

As shown in FIG. 1a, the rotor unit 130 includes an eccentric weight 131, a rotary shaft 132, a commutator 134 and an armature 136. The rotary shaft 132 is fixed to the eccentric weight 131 having an eccentric center of gravity at one end thereof, and a stationary member 138 at the other end thereof.

The armature 136 is disposed around the rotary shaft 132, fixed to the periphery of the stationary member 138 parallel with the rotary shaft 132. The armature 136 has a structure coiled by a wire (not shown) or includes coils (not shown).

On the other hand, the commutator 134 having several separate segments is attached on the side of the stationary member 138.

The commutator 134 is made of conductive materials, and electrically connected with the armature 136.

In this case, the stationary member 138 has a cylindrical projection 138a extruded from one side of the stationary member 138.

Therefore, the commutator 134 having the separate segments is attached on the side of the stationary member 138 to surround the projection 138a and the side of the stationary member 138.

As above mentioned, the rotor unit 130 is rotatably mounted on the stator unit 110.

In other words, as shown in FIG. 1a, the rotary shaft 132 is inserted into the yoke body 114b, and rotatably supported at one end thereof by a first bearing 102 inserted into the bearing insert groove 114a and at the other end thereof by a second bearing 104 inserted into the rear end of the yoke body 114b.

In this case, the armature 136 is spaced apart from the magnet 116.

Next, the power supply unit 150 will be explained.

The power supply unit 150 includes a fixing cap 152 and a pair of brushes 154 mounted in the fixing cap 152.

The brushes 154 are touched with the commutator 134 surrounding the periphery of the projection 138a by coupling the fixing cap 152 to the other end of the housing 112.

At this time, the brushes 154 are provided with supply voltage through lead wires (not shown) connected with the brushes 154.

The voltage applied to the brushes 154 as above is in turn supplied to the commutator 134 touched with the brushes 154.

Therefore, when the wire or the coils (not shown) of the armature 136 is energized by the voltage to the commutator 134, electromagnetic force is generated through the interaction between the armature 136 and the magnet 116 attached on the outer surface of the yoke body 114b.

When the electromagnetic force is applied to the armature 136, as the rotary shaft 132 is rotated, vibration is generated by rotating the eccentric weight 131 fixed to the one end of the rotary shaft 132.

However, the conventional bar type vibration motor has following problems.

As shown in FIG. 1b, since the body 111 is obtained by presseing the yoke body 114b into the housing 112, and then welding then together, it is difficult to apply the body 111 to a miniaturized vibration motor.

In other words, as the bar type vibration motor is miniaturized, the thickness of the housing 112 and the york 114 also get thin.

Therefore, when the yoke 114 is pressed into the housing 112 first, the flange 114c of the yoke 114 is bent or deformed under the pressure.

Also, when the pressed portion between the housing 112 and the yoke 114 is welded after the pressing, there is a problem that the pressed portion is thermally deformed due to the thinness of the housing 112.

Figure 2A:
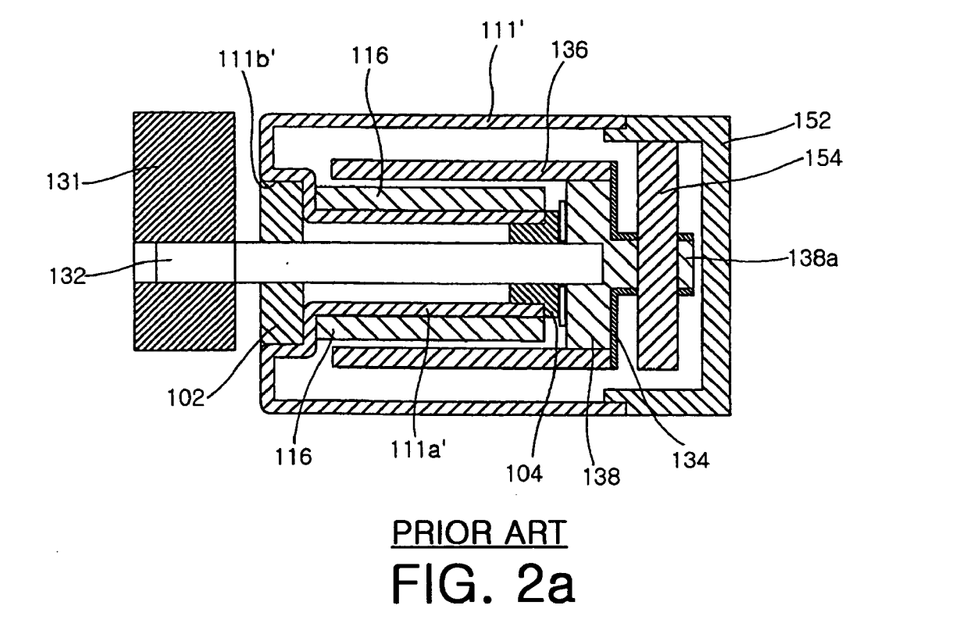
FIG. 2a is a side sectional view illustrating a conventional bar type vibration motor.
Figure 2B:
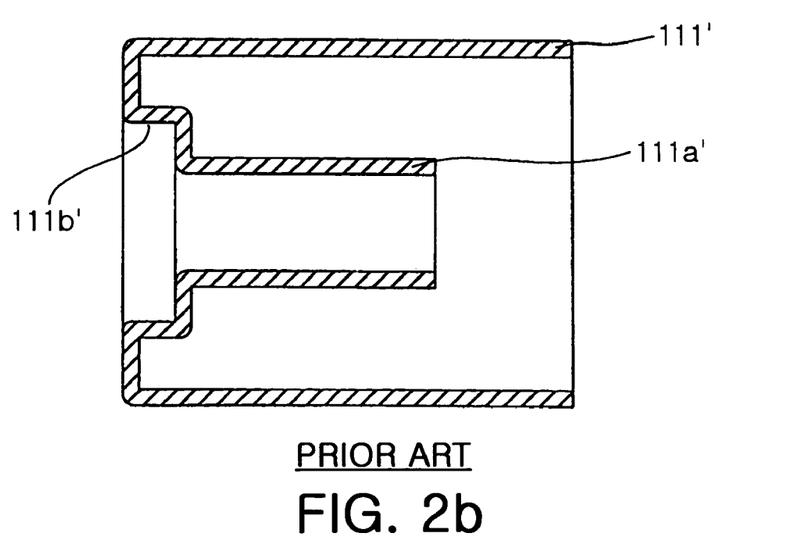

An integral body 111' shown in FIGS. 2a and 2b was proposed to solve the above problem.

In other words, the proposed body 111' has a double-pipe structure in which a support tube 111a' is formed integrally in the body 111' and a bearing insert groove 111b' is formed at one end of the support tube 111a'.

However, a conventional bar type vibration motor using the integral body 111' has following problems.

When impact is applied to a mobile phone mounted with a conventional bar type vibration motor using the integral body 111', the impact is transferred to first and second bearings 102 and 104 supporting the rotary shaft 132.

In this case, the first bearing 102 disposed more adjacent to the eccentric weight 131 for supporting the rotary shaft 132 is more frequently deformed than the second bearing 104.

Also, when the vibration is generated by the rotation of the rotary shaft 132, there is a problem that the first bearing 102 is worn away earlier than the second bearing 104.

Because larger load is applied to the first bearing 102 disposed more adjacent to the eccentric weight 131, the degree of the deformation or abrasion occurred on the first 102 is different from that of the second bearing 104.

On the other hand, when the rotary shaft 132 rotates, the abrasion and deformation of the bearings prevents the rotary shaft 132 from rotating smoothly causing undesirable noise.

Therefore, there was a problem that the expected life span of a bar type vibration motor was shortened.

As a solution to the above problem, there was proposed an approach for increasing the length of the first bearing, on which bigger load is exerted to reduce the deformation or abrasion.

That is, this approach increases the depth of the bearing insert groove 111b' formed in one end of the body 12 and inserts a longer bearing or several bearings into the bearing insert groove 111b', in order to reduce damage or abrasion of the bearings brought by impact.

But, if the depth of the bearing insert groove 111b' is increased to prolong the length of the bearing inserted into the bearing insert groove 111b' as above, the length of the magnet 116 is to be reduced in proportion to the reduction of a space in the body 111'. This brings an another problem of degrading the performance of the vibration motor by the reduction of an area for forming a magnetic field.

Therefore, because the body 111' can be formed integrally, the body 111' can be manufactured without deformation occurred by pressing or welding. But the expected life span of the bar type vibration motor was shortened due to the abrasion of a bearing by the eccentric weight 131 or the deformation of a bearing supporting the rotary shaft under the external impact.

Also, as shown in FIGS. 1a and 2a, because the rotary shaft 132 is fixedly inserted into the stationary member 138, the thickness of the stationary member 138 should be increased to improve the axial coupling force between the rotary shaft 132 and the stationary member 138.

On the other hand, it is difficult to miniaturize the vibration motor, because a projection 138a is formed on the side of the stationary member 138 to contact the brushes 154 with the commutator 134.

And, because the commutator 134 is divided into several segments, sparks are generated between the commutator 134 and the brushes 154, when the brushes 154 touch the segments from one to an other.

Unfortunately, the sparks occuring as above damage the commutator 134 and the brushes 154.

SUMMARY OF THE INVENTION

Therefore the present invention has been made to solve the foregoing problems of the prior art.

It is an object of the present invention to provide a bar type vibration motor having a body designed into an integral structure, so that a bearing insert groove is formed of a projection extruded from the body, in order to steadily support the rotary shaft.

It is another object of the present invention to provide a bar type vibration motor with an integral body structure to facilitate manufacturing while improving endurance.

It is other object of the present invention to provide a bar type vibration motor improved in a contact structure between the commutator and the brushes and coupling structure between a stationary member and a rotary shaft in order to miniaturize the vibration motor.

It is yet another object of the present invention to provide a bar type vibration motor having a commutator mounted with a varistor thereon to prevent a brush or a commutator from damage by spark.

According to an aspect of the invention for realizing the object, there is provided a bar type vibration motor comprising: a stator unit including a body having a bearing insert groove formed at one end thereof and exposed to the outside, and a magnet attached to the body; a rotor unit including a rotary shaft having one end fixed to an eccentric weight, both ends of the rotary shaft being rotatably supported in the body, and an armature fixed to the rotary shaft at a space from the magnet; and a power supply unit including a fixing cap fixed to the body and brushes mounted on the fixing cap to supply voltage to the armature.

Preferably, the body comprises a hollow cylinder of a double-pipe structure having a support tube connected with the bearing insert groove, the magnet being fixed to an outer surface of the support tube.

Preferably, a stationary member is fixed to the other end of the rotary shaft, a commutator divided into the several segments and electrically connected with the armature is attached on the side of the stationary member, the commutator is in touch with the brushes.

The bar type vibration motor further comprises a stationary member fixed to the other end of the rotary shaft; a commutator attached on the side of the stationary member, the commutator being divided into the several segments and electrically connected with the armature, and in touch with the brushes.

Preferably, the armature has a structure coiled by a wire or may include coils.

Preferably, the bearing insert groove is formed by a projection extruded from the one end of the body to the outside, and the magnet is fixed to the inner surface of the body.

Preferably, the body is integrally formed by drawing, and the portion forming the projection of the body has uniform thickness, and the thickness of the portion forming the projection is at least the thickness of other portion in the body.

Preferably, the stationary member is shaped as a disk, and the armature is attached on the periphery of the stationary member, and more preferably the commutator may include terminals for electrical connection with the armature.

And, the commutator has varistors on one side thereof for preventing spark generated through contact with the brushes and the commutator.

Preferably, the stationary member is formed integrally with the rotary shaft to house a coupling member therein.

Preferably, the brush has a free end and a fixed end bent in an acute angle to elastically contact the commutator.

Preferably, the coupling member comprises a snap ring fixed to the rotary shaft, and the coupling member comprises a pin fixedly inserted into the rotary shaft.

Preferably, the brushes are fixed to a circuit board mounted in the fixing cap to be electrically connected with the circuit board, more preferably the circuit board is a PCB or a FPC.

BRIEF DESCRIPTION OF THE DRAWINGS

FIGS. 1a and 1b are illustrations of a conventional bar type vibration motor, in which FIG. 1b is a sectional view illustrating the body shown in FIG. 1a;

FIGS. 2a and 2b are illustrations of a conventional bar type vibration motor having an another body type, in which FIG. 2b is a sectional view illustrating the body shown in FIG. 2a;

FIGS. 4a and 4b are illustrations of a bar type vibration motor according to a preferred embodiment of the present invention, in which FIG. 4b is a sectional view illustrating a body shown in FIG. 4a;

FIGS. 5a to 5c are illustrations of a rotary shaft and a coupling member of a bar type vibration motor according to the present invention, in which FIG. 5a illustrates a rotary shaft and a coupling member of a bar type vibration motor according to a first embodiment of the present invention, FIG. 5b illustrates a modification to those shown in FIG. 5a, and FIG. 5c illustrates a second modification to those shown in FIG. 5a;

FIGS. 6a and 6b are illustrations of commutators of the bar type vibration motor according to the present invention, in which

DETAILED DESCRIPTION OF THE PREFERRED EMBODIMENT

Figure 3:
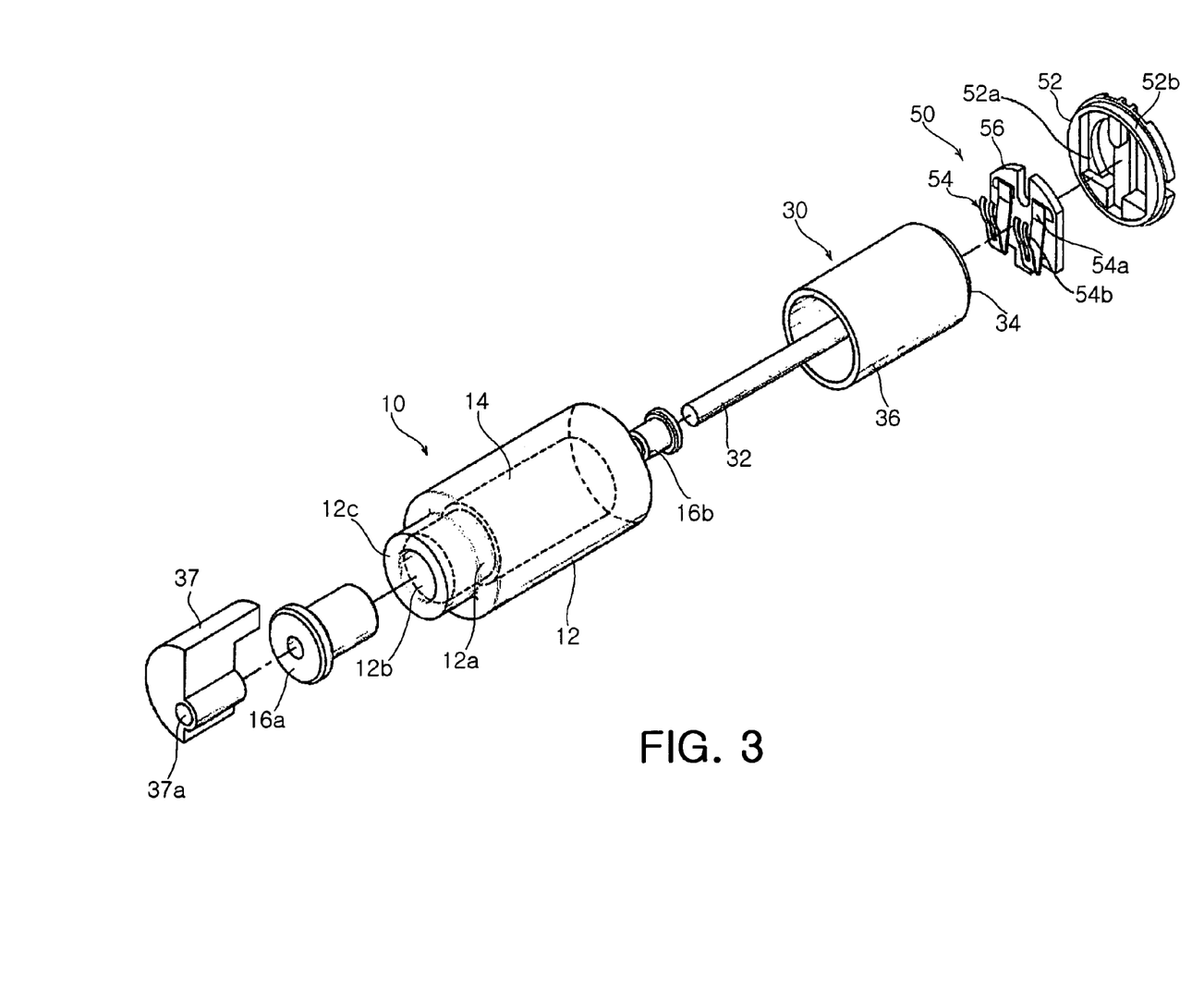
FIG. 3 is an exploded perspective view illustrating a bar type vibration motor according to a preferred embodiment of the present invention.

As shown in FIG. 3, the bar type vibration motor 1 according to the present invention includes a stator unit 10, a rotor unit 30 and a power supply unit 50, in which the stator unit 10 will be described first.

Figure 4A:
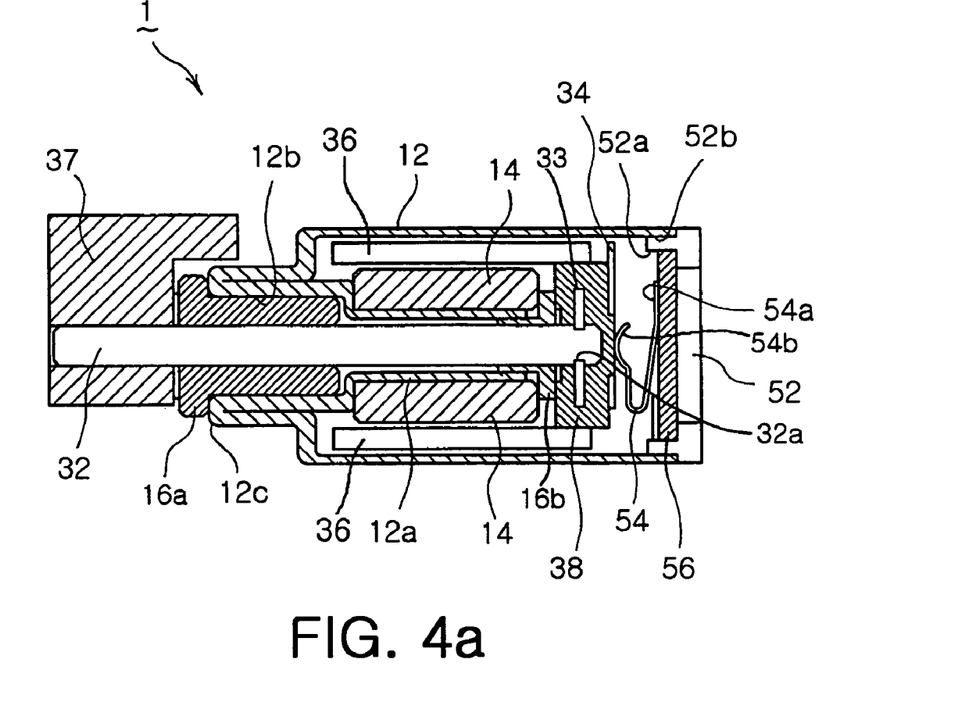
FIG. 4a is a side sectional view illustrating.
Figure 4B:
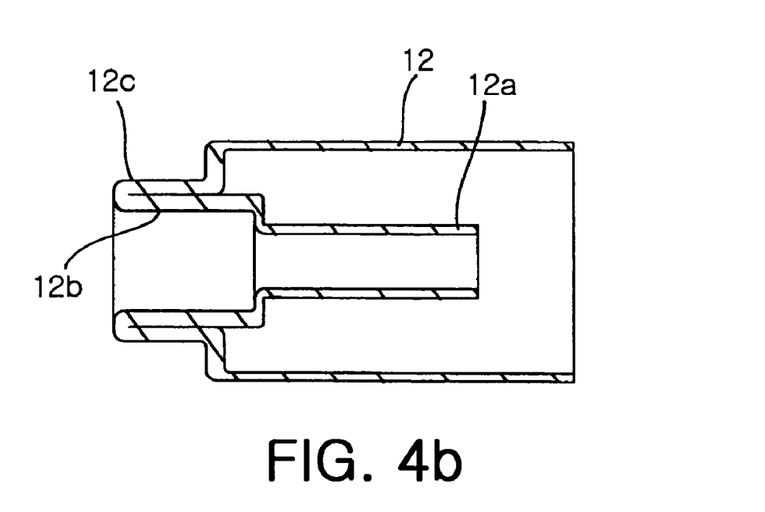

As shown in FIGS. 3 and 4, the stator unit 10 includes a body 12 and a magnet 14.

The body 12 is of a hollow cylinder formed with a cylindrical projection 12c extruded from one end thereof to the outside.

In this case, the body 12 has a double-pipe structure, with a hollow support tube 12a being formed integrally at the rear end of the projection 12c and disposed in the body 12.

On the other hand, as shown in FIG. 4b, a bearing insert tube 12b is formed inside the projection 12c.

The bearing insert tube 12b is stepped out and expanded from the support tube 12, and the projection 12c is folded back from the insert tube 12b. In addition, an outer wall 12d is stepped out and expanded from the projection 12c around the support tube 12a.

Therefore, bearing insert groove 12b is formed outside the body 12.

Since the diameter of the bearing insert groove 12b is bigger than the inside diameter of the support tube 12a that is formed integrally at the rear end of the projection 12c, the bearing insert groove 12b is connected with the support tube 12a via a step formed therebetween.

The other end of the body 12 is shaped as an opened hollow cylinder.

The support tube 12a is shorter than the body 12 so that the rear end of the support tube 12a is located in the body 12.

On the other hand, as shown in FIG. 4b, the body 12 is formed integrally by shaping a sheet metal. Preferably, the body 12 may be formed integrally via drawing that is a well-known method to form an article jointlessly on the basis of the ductility of material.

In this case, the portion of the sheet metal forming the projection 12c is bent at a uniform thickness, and the board thickness of the portion forming the projection 12c is equal to or thicker than other portion of the body 12 for example the support tube 12a to support a rotary shaft 32 to be described later more firmly.

The stator unit 10 consists of the body 12 and the magnet attached to the body 12. As shown in FIG. 4a, the magnet 14 may be attached to the outer surface of the support tube 12a.

Next, the rotor unit 30 will be explained with reference to the FIGS. 3 and 4a.

As shown in FIG. 3, the rotor unit 30 includes a rotary shaft 32 and an armature 36.

An eccentric weight 37 is fixed to one end of the rotary shaft 32, and a stationary member 38 is fixed to the other end of the rotary shaft 32.

In other words, the eccentric weight 37 has a perforated insert hole 37a, and is fixed to the rotary shaft 32 by inserting the rotary shaft 32 into the insert hole 37a and then attaching them together via calking or adhesive.

In this case, the eccentric weight 37 has a center of gravity formed eccentrically about the insert hole 37a. Therefore, rotating the eccentric weight 37 about the insert hole 37a generates vibration.

On the other hand, as shown in FIG. 4a, the stationary member 38 is a flat disk type without a projection formed at one side thereof different from a conventional stationary member, and a flat disk-type commutator 34 is attached on the stationary member 38.

A cylindrical armature 36 is attached on the stationary member 38, and disposed parallel with and around the rotary shaft 32, and the armature 136 may have a structure coiled by a wire (not shown) or may include coils (not shown).

In this case, the commutator 34 composed of conductive metal chip divided into several segments is attached on the stationary member 38, and electrically connected with the armature 36.

In other words, the commutator 34 is electrically connected via cables (not shown) to supply voltage to the coils or wire which may be included in the armature 36.

Therefore, when the commutator 34 is applied with external voltage, current is supplied to the armature 36.

While the present embodiment has described about the commutator 32 made of conductive metal chip, the commutator 32 may be replaced with a conductive pattern directly printed on one side of the stationary member 38. In this case, the conductive pattern is electrically connected with the armature 36.

Alternatively, the commutator 36 may be also replaced with a circuit board having a conductive pattern thereon to connect the armature 36 with the conductive pattern.

In this case, the circuit board may be preferably adopted as a Printed Circuit Board (PCB) or Flexible Printed Circuit board (FPC), but it may be applicable to any thing which has conductive patterns.

On the other hand, as shown in FIG. 4a, the stationary member 38 has a coupling member 33 formed integral therein, in which the coupling member 33 is coupled with a coupling groove 32a formed on the other end of the rotary shaft 32.

In other words, after the coupling member 33 is coupled with the coupling groove 32a, the stationary member 38 may be injection molded to integrally house the coupling member 33 therein.

Therefore, the stationary member 38 may be formed thinner while the axial coupling force is maintained between the rotary shaft 32 and the stationary member 38.

Figure 5:
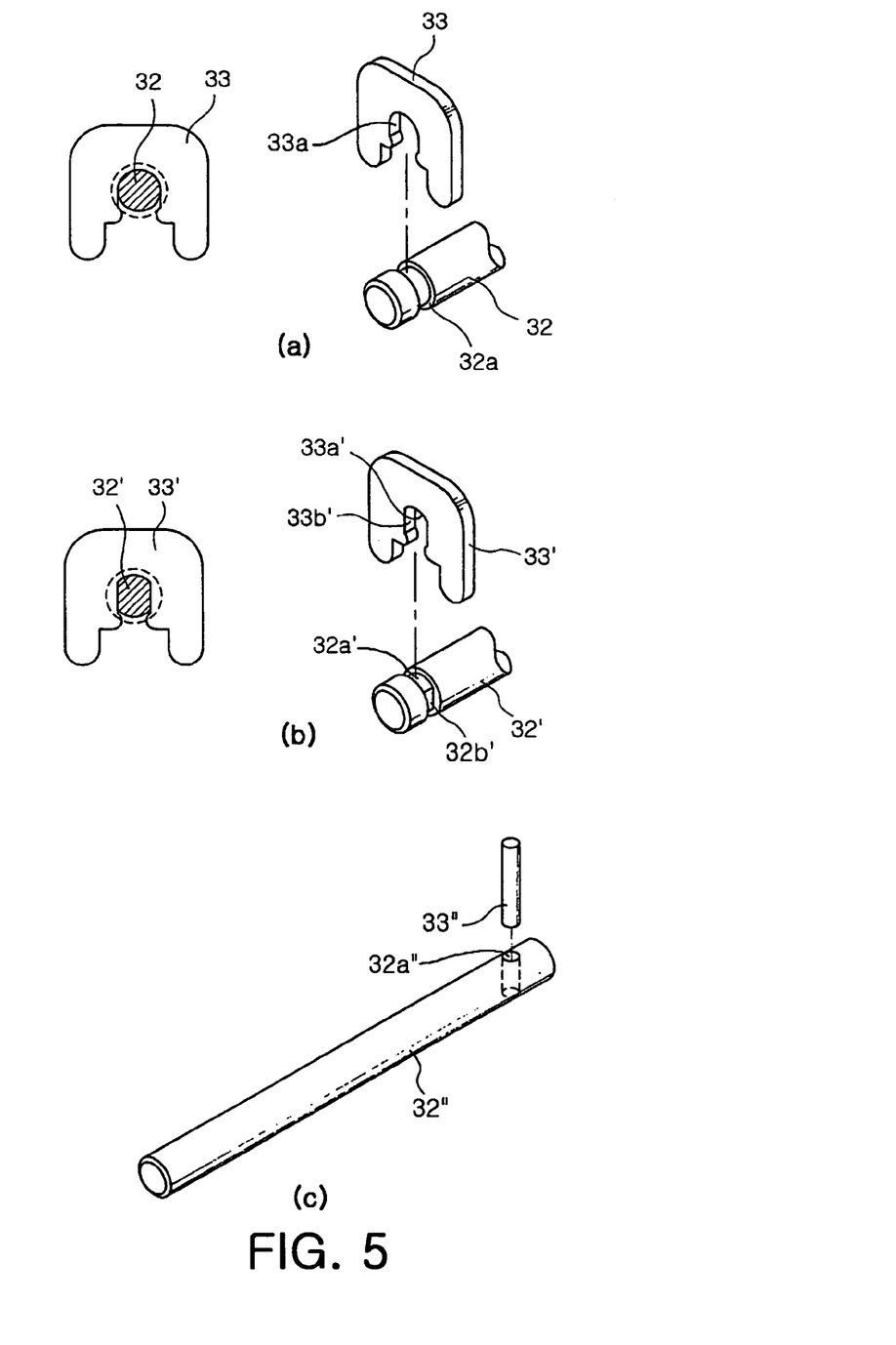

The rotary shaft 32 and the coupling member 33 according to the first embodiment of the present invention are shown in FIG. 5a, and the coupling member 33 has an opening 33a for coupling with the coupling groove 32a formed in the rotary shaft 32. The coupling member 33 may be preferably a snap ring.

On the other hand, FIG. 5b is a view illustrating a coupling structure for a rotary shaft 32' and a coupling member 33' according to a modification to those in FIG. 5a. A flat-end 33b' is formed in the opening 33a' of the coupling member 33' and a flat-end 32b' is formed in the coupling groove 32a' so that the ends 33b' and 32b' contact each other to prevent the rotation the coupling member 33' about the rotary shaft 32'.

Therefore, the stationary member injection molded to a coupling member 33 can enhance axial coupling force to the rotary shaft 32 as well as may transmit torque more efficiently from the armature to the rotary shaft.

FIG. 5c shows a rotary shaft 32" and a coupling member 33" according to a second modification to those in FIG. 5a, in which the rotary shaft 32" may have an inserting hole 32a" in place of the coupling groove and a pin 33" in place of the coupling member.

On the other hand, as shown in FIG. 4a, the commutator 34 is attached on one side of the stationary member 38, and the commutator 34 may be electrically connected with the armature 36 fixed around the stationary member 38 by cables (not shown).

Figure 6:
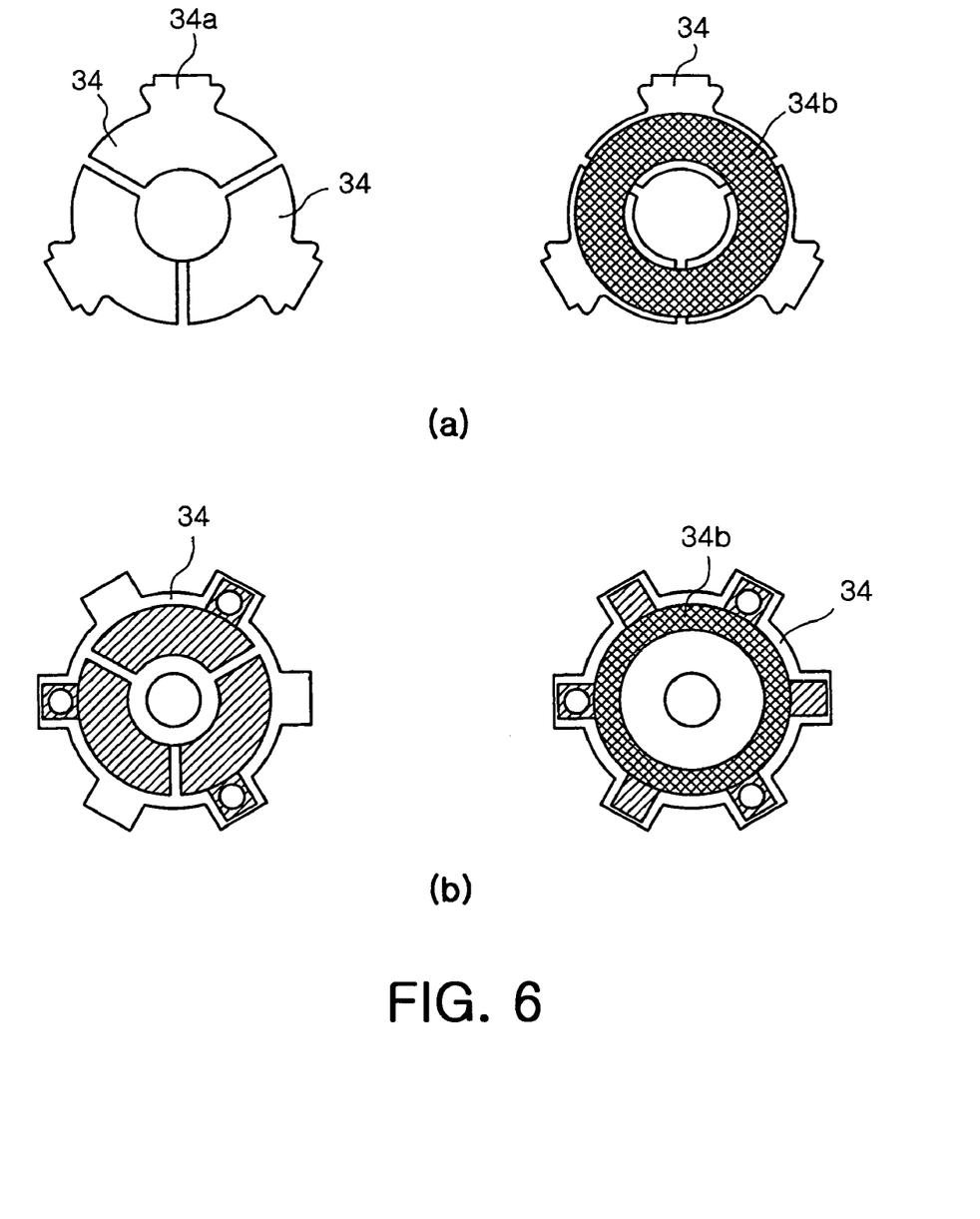
FIG. 6a is a front and rear view illustrating a commutator consisting of a metal chip.
FIG. 6b is a front and rear view illustrating a commutator formed of a printed circuit board.

In this case, as shown in FIG. 6a, the commutator 34 may be made of a metal chip divided into several segments, and has terminals 34a extruded radially from the commutator 34 for connection with the armature 36.

Also, a varistor 34b may be attached or formed on the commutator 34 in order to prevent the commutator 34 from being damaged by sparks in the contact with brushes, which will be described later.

The varistor 34b is a non-linear semiconductor resistance unit converting its resistance value with respect to voltage applied to both terminals to prevent sparks by electric contacts or protect electronic components from sparks or static electricity.

On the other hand, as shown in FIG. 6b, the commutator 34 may be a PCB (printed circuit board) with conductive patterns printed thereon.

In this case, patterns may be formed on one side of the PCB to be used as the varistor 34b.

In the present embodiment, while the PCB is adopted as a commutator, any of those having conductive patterns may be applied as a commutator.

The rotor unit 30 is rotatably assembled with the stator unit 10, and a resultant structure will describe as follow.

As shown in FIG. 4a, a first bearing 16a is inserted into the bearing insert tube 12b extruded from one end of the body 12 to the outside, and a second bearing 16b is inserted into the end of the support tube 12a.

The rotary shaft 32 is supported at its both ends by first and second bearings 16a and 16b fixed to the support tube 12a, respectively, so the rotor unit 30 is rotatably assembled in the stator unit 10.

In this case, because the bearing insert tube 12b is projected outward from the body 12, the bearing insert tube 12b may not interfere with other components such as the magnet 14 even though its length or depth is increased.

Therefore, the bearing insert tube 12b may be not damaged by external impact, and be deep enough to house a long bearing capable of scattering the impact.

Next, the power supply unit 50 will be explained.

As shown in FIG. 3, the power supply unit 50 includes a fixing cap 52 and brushes 54, and the fixing cap 52 has a coupling step 52b formed in the periphery of the fixing cap 52 to be coupled with the opened other end of the body 12.

The fixing cap 52 coupled with the opened other end of the body 12 has an opening 52a therein so that a substrate member 56 can be seated in the opening 52a.

The substrate member 56 has conductive patterns formed thereon, and the brushes 54 are electrically connected and fixed to the conductive patterns. A lead wire (not shown) is electrically connected with the conductive patterns formed on the substrate member 56 to supply votage to the substrate member 56.

Therefore, the brushes 54 supply external voltage to the armature 36 through the substrate member 56.

On the other hand, as shown in FIG. 4a, when the fixing cap 52 is coupled with the other end of the body 12, the brushes 54 are elastically touched with the commutator 34 fixed to the stationary member 38.

In this case, the brush 54 has a fixed end 54a fixed to the substrate member 56 and a free end 54b touching the commutator 34, the fixed end 54a is bent at an acute angle with respect to the free end 54b.

In other words, when the fixing cap 52 is coupled with the other end of the body 12, the free end 54b is compressed toward the fixed end 54a by the free end 54b to elastically touch the commutator 34 attached on the stationary member 38.

While a PCB or FPC is adopted as the substrate member 56 to which the fixed end 54a of the brush 54 is fixed, any one of those having conductive patterns may be applied as the substrate members 56.

Figure 7:
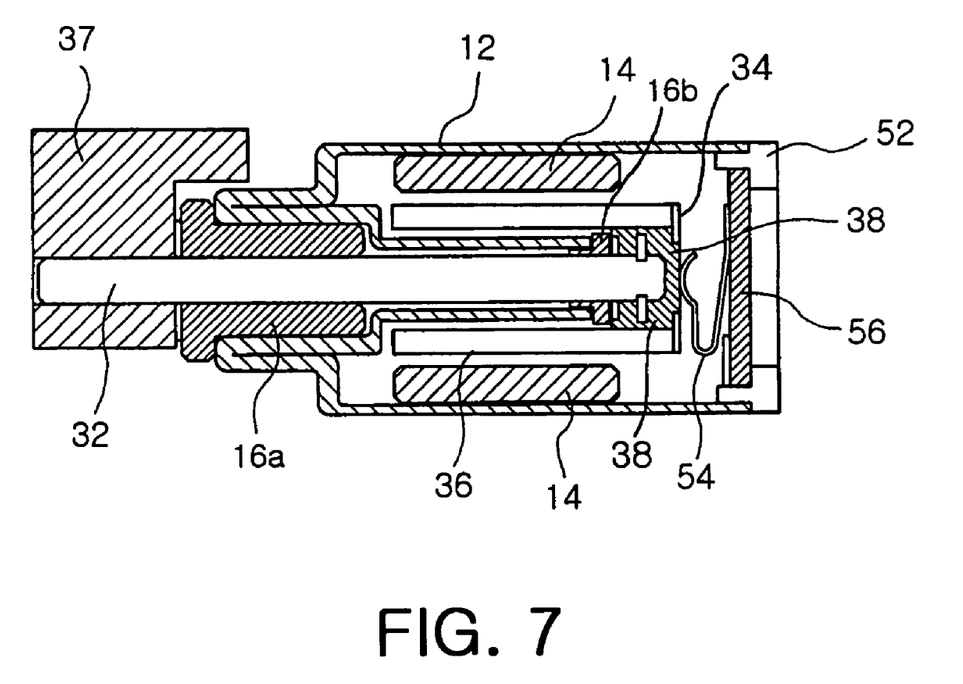
FIG. 7 is a side sectional view illustrating a bar type vibration motor according to an alternate embodiment of the present invention.

FIG. 7 shows a bar type vibration motor according to an alternate embodiment of the present invention, which has a magnet 14 fixed to the inside of the body 12 and an armature 36 spaced from the magnet 14 unlike the foregoing embodiment.

Other components of the alternate embodiment of the present invention are the same as those of the above mentioned embodiment, so they will not be described hereinafter.

As above mentioned, because the body 32 of the bar type vibration motor according to embodiments of the present invention is integrally formed, the motor of present invention is free from the bending or thermal deformation of the yoke and the housing during the assembly thereof unlike the prior art.

As the bar type vibration motor is miniaturized and lighter, both of the yoke and the housing become smaller and thinner so it is difficult to fix the yoke with the housing by pressing or welding.

However, the present invention can overcome the foregoing difficulty associated with the fabrication by integrally forming the body of the bar type vibration motor.

On the other hand, because the bearing insert tube 12b formed by the projection 12c extruded from the one end of the body 12 is disposed outside the body 12, the bearing insert tube 12b may house a long bearing without interference with other components to scatter external impact so as to protect the bearing from damage by the impact.

In other words, the length of the magnet 14 needs not to be decreased, because the depth of the bearing insert tube 12b is increased by extending the projection 12c to the outside of the body 12 to house a longer bearing.

Therefore, because the magnetic field formed in the body is not decreased, the performance of the bar type vibration motor is not deteriorated and the rotary shaft 32 is steadily supported. So, the bar type vibration motor according to the present invention may have improved impact resistance, and therefore prevent reduction in the expected life span by the breakage of the bearing as well as the rapid abrasion of a first bearing 16a by the rotation of the rotary shaft 32.

Also, the invention uses the flat disk-type stationary member 38 and improves the contacting structure of the commutator 34 and the brushes 54, so that the brushes 54 elastically touch the commutator 34 fixed to the stationary member 38, in order to minimize the deformation of the brush 54 as well as decrease the size of the vibration motor.

On the other hand, the stationary member 38 can retain axial coupling force to the rotary shaft 32 while reducing the thickness thereof since it is injection molded integrally with the rotary shaft 32 with the coupling member 33 for coupling with the rotary shaft 32 being housed therein.

Also, since the invention improves the stationary member 38 into a flat circular shape as well as the contact structure between the brushes 54 and the commutator 34 so that the brushes 54 contact the commutator 34 fixed to the one side of the stationary member 38, the projection 138a formed in the conventional stationary member 138(FIG. 1a) becomes unnecessary, and thus it is possible to minimize the vibration motor.

The commutator 34 or the brushes 54 can be protected from sparks generated between the commutator 34 and the brushes 54 since the varistor is formed on one side of the commutator 34 to decrease spark.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

According to the present invention, the body may steadily support the rotary shaft while scattering external impact without shortening the magnet, since the bearing insert groove is extruded to the outside of the body.

Further, the bar type vibration motor may be easily manufactured and have higher durability by improving the body into an integral structure to prevent deformation in manufacturing.

Moreover, the contact structure of the commutator and the brushes, and the coupling structure of the stationary member and the rotary shaft are improved in such a fashion of miniaturizing the vibration motor. In addition, the varistor is mounted on the commutator to prevent the brushes or the commutator from the damage by sparks.

What is claimed is:

1. A bar type vibration motor, comprising:
   a stator unit including a body of an integral double-pipe structure and a magnet attached to the body wherein the body includes a support tube, a bearing insert tube stepped out and extending forwardly from the support tube, a first outer wall folded back from the insert tube and a second outer wall stepped out and extending rearwardly from the first outer wall and around the support tube;
   a rotor unit including a rotary shaft having one end fixed to an eccentric weight, the rotary shaft being rotatably supported in the body via a bearing inserted into the bearing insert tube, and an armature fixed to the rotary shaft between the support tube and the outer wall and radially spaced from the magnet; and
   a power supply unit including a fixing cap fixed to a rear end of the outer wall of the body and brushes mounted on the fixing cap to supply a voltage to the armature.

2. The bar type vibration motor according to claim 1, wherein the magnet is fixed to an outer surface of the support tube.

3. The bar type vibration motor according to claim 1, further comprising member fixed to the rotary shaft; and
   a commutator attached on a side of the member, the commutator being divided into several segments and electrically connected with the armature, and in touch with the brushes.

4. The bar type vibration motor according to claim 3, wherein the member is shaped as a disk, and the armature is attached to the periphery of the disk.

5. The bar type vibration motor according to claim 3, wherein the commutator includes terminals for electrical connection with the armature.

6. The bar type vibration motor according to claim 3, wherein the member has varistors on an opposite side thereof for preventing sparks generated between the brushes and the commutator.

7. The bar type vibration motor according to claim 3, wherein the member is formed integrally with the rotary shaft to house a coupling element therein.

8. The motor of claim 7, wherein the coupling element comprises a snap ring fixed to the rotary shaft and completely housed within said member which is injection molded around said snap ring and an end portion of said shaft.

9. The motor of claim 8, wherein said snap ring has a non-circular inner edge engaged with a noncircular outer surface of said rotary shaft so that said snap ring is irrotationally fixed to said rotary shaft.

10. The bar type vibration motor according to claim 7, wherein the coupling element comprises a pin fixedly inserted into the rotary shaft and extending at about a right angle to a rotational axis of said shaft.

11. The bar type vibration motor according to claim 3, wherein each of the brushes has a free end and a fixed end bent in an acute angle to elastically contact the commutator.

12. The motor of claim 3, wherein said member is a circuit board printed on one side with conductive patterns defining said commutator and on an opposite side with varistors for preventing sparks generated between the brushes and the conductive patterns.

13. The bar type vibration motor according to claim 1, wherein the armature has a wire or coils.

14. The bar type vibration motor according to claim 1, wherein the bearing insert tube and the first outer wall together define a double wall protection which is the forwardmost portion of the body.

15. The bar type vibration motor according to claim 14, wherein the body is integrally formed by drawing, and the projection of the body has a uniform thickness, and the thickness of the projection is at least equal to the thickness of other portions in the body.

16. The bar type vibration motor according to claim 1, wherein the magnet is fixed to an inner surface of the second outer wall.

17. The bar type vibration motor according to claim 1, wherein the brushes are fixed to and electrically connected with a circuit board mounted in the fixing cap.

18. The bar type vibration motor according to claim 17, wherein the circuit board is a FPC.

19. The motor of claim 1, wherein said body includes a folded portion which connects the bearing insert tube with the first outer wall and defines the forwardmost point of said body.

20. The motor of claim 1, wherein said bearing insert tube has a first uniform thickness, and said support tube has a second uniform thickness less than the first uniform thickness.

21. A bar type vibration motor comprising:
- a stator unit including a body having a bearing insert groove formed at one end thereof and exposed to the outside, and a magnet attached to the body;
- a rotor unit including a rotary shaft having one end fixed to an eccentric weight, both ends of the rotary shaft being rotatable supported in the body, and an armature fixed to the rotary shaft at a space from the magnet;
- a power supply unit including a fixing cap fixed to the body and brushes mounted on the fixing cap to supply voltage to the armature;
- a stationary member fixed to the other end of the rotary shaft; and
- a commutator attached on the side of the stationary member, the commutator being divided into several segments and electrically connected with the armature, and in touch with the brushes;

wherein the stationary member is formed integrally with the rotary shaft to house a coupling member therein; and wherein the coupling member comprises a snap ring fixed to the rotary shaft.

* * * * *